April 7, 1970 — T. E. SHANLEY — 3,504,962
WINDOW BLIND APPARATUS

Filed June 30, 1967 — 2 Sheets-Sheet 1

THOMAS E. SHANLEY
INVENTOR

BY John W. Young
ATTORNEY

April 7, 1970     T. E. SHANLEY     3,504,962
WINDOW BLIND APPARATUS

Filed June 30, 1967     2 Sheets-Sheet 2

THOMAS E. SHANLEY
INVENTOR

BY *John W. Young*
ATTORNEY

3,504,962
WINDOW BLIND APPARATUS
Thomas E. Shanley, 137 Beethoven St.,
Binghamton, N.Y. 13905
Filed June 30, 1967, Ser. No. 650,344
Int. Cl. G02b 27/00; G02t 1/30
U.S. Cl. 350—260                             1 Claim

ABSTRACT OF THE DISCLOSURE

The invention of the present application relates to an apparatus for use as a combination storm window and window blind, and the like, comprised of a fixed frame including a light transmitting element having vertical columns and horizontal rows of alternately transparent and opaque areas and a relatively movable light transmitting element having vertical columns and horizontal rows of alternately successive opaque and transparent areas whereby the relative movement of said movable transmitting element is operative to vary the light transmitting characteristics of said apparatus.

---

This invention relates to window blinds, shutters, shades, screens and the like, and more particularly, to an apparatus or window blind, and the like, for providing decorative and aesthetic effects on values.

It is well known that light transmitted through a tinted medium will project and portray an illusion of color due to the frequency or wave length of the light that is allowed and permitted to pass therethrough. For example, glass of a red tint will transmit light of a frequency or wave length in the red spectral region, the tinted glass acting as an optical filter.

It is an object of this invention, utilizing the principle recited above, to devise and provide a window blind, screen, shutter, shade or the like whereby certain aesthetic, decorative and ornamental effects and values can be obtained, as desired, while at the same time, providing a functional blind, screen, shutter or the like.

It is a further object of this invention to provide an apparatus which can be permanently or temporarily fixed in a window frame, yet permit a variation of aesthetic effects, as desired.

A more particular object of this invention is to provide window blind apparatus that will permit a variation in control so that light conditions can be varied from a normal light condition to a desired aesthetic condition. The phrase "window blind" as used hereinafter will denote sunblind, shade, shutter, blind, screen and the like.

The invention comprises generally an envelope, in the shape of a window frame or screen, with the light transmitting portions thereof being comprised of elements or mediums possessing light transmitting characteristics of a first particular wave length, frequency, or spectral characteristic. Interposed between the opposed light transmitting mediums is an adjustable light transmitting element or elements of a second wave length, frequency or spectral characteristic. The adjustable elements are selectively arranged so that upon adjustment peculiar or desired aesthetic effects can be realized.

To these and other ends, the inventions consists in the construction and arrangement of parts that will appear more clearly from the following description when read in conjunction with the accompanying drawings, the novel features being pointed out in the claim following the specification.

The preferred embodiment of the invention comprises an envelope 1 for insertion into standard window frames; and in its essence is similar in construction to some standard forms of storm windows.

Figure 1:
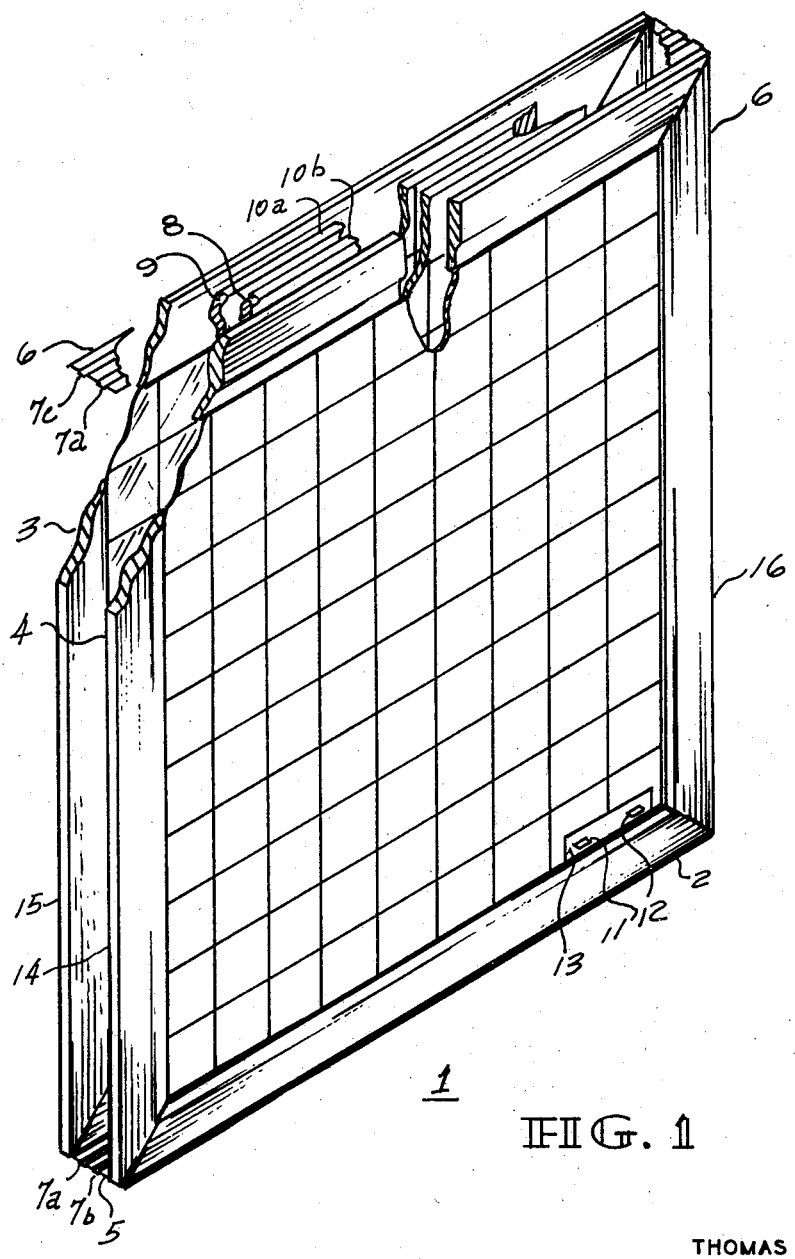
FIG. 1 is a cut-away isometric view showing the application thereto of a preferred embodiment of the invention.

Referring now to FIG. 1, envelope 1 is composed of a frame 2, which has been cut away for the sake of clarity, to illustrate the essential elements of its construction, to which light transmitting elements 3 and 4 are securely attached.

The lower horizontal section 5 and the upper horizontal section 6 of frame 2 are provided with tongues 7a, 7b, 7c and 7d.

Interposed intermediate light transmitting elements 3 and 4 are two further light transmitting elements 8 and 9; element 8 having light transmitting characteristics different and distinct from the light transmitting characteristics of elements 3 and 4 and 9. The characteristics of element 9 can also be varied as desired, as will be pointed out hereinafter.

Each light transmitting element 8 and 9 is provided with a set of grooves, 10a, 10b along the upper and lower horizontal edges thereof, to permit lateral adjustment of the elements 8 and 9 within the envelope, tongues 7a through 7d cooperating with grooves 10a, 10b, etc.

Adjusting tabs 11 and 12 secured respectively to elements 8 and 9 protrude through opening 13 of element 4 and provide the means for selectively adjusting, horizontally or laterally, elements 8 and 9.

Figure 2:
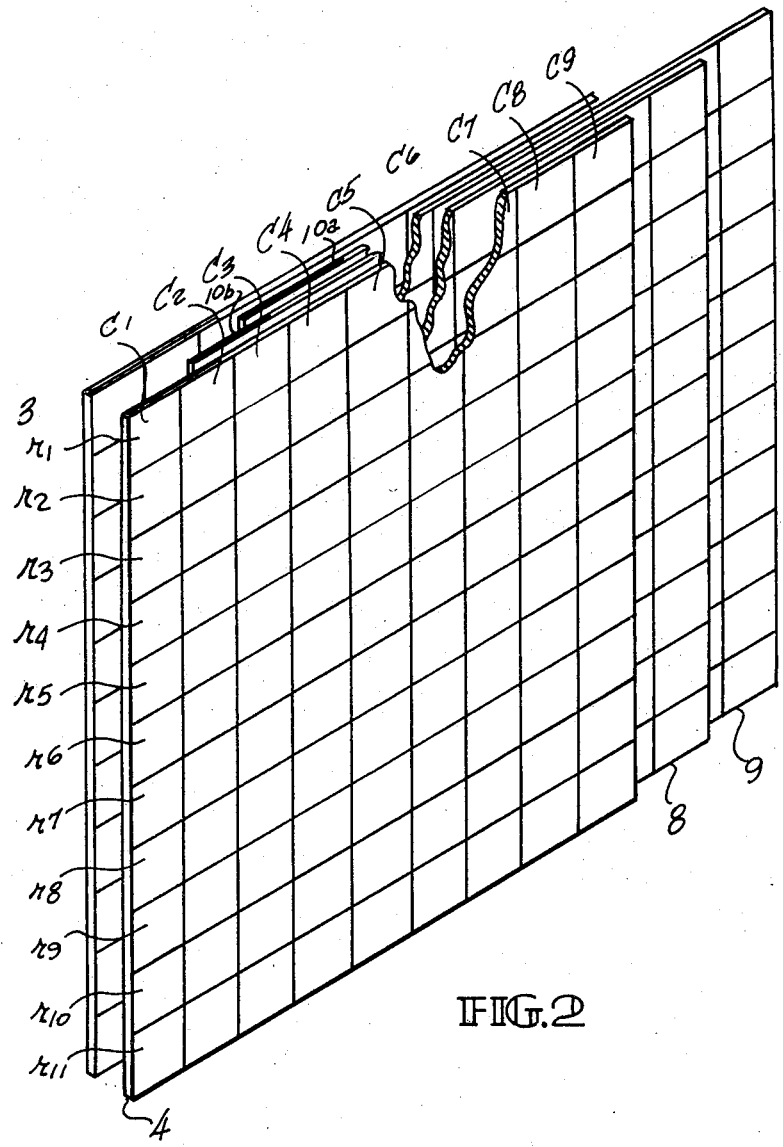
FIG. 2 is a further isometric view illustrating in detail the configuration of the various elements or mediums, to more clearly illustrate the functions thereof.

Referring now to FIG. 2 which illustrates, more particularly, the physical configuration of the light transmitting elements 3, 4, 8 and 9, each element 3, 4, 8 and 9 is manufactured preferably out of a plastic material, whereby particular areas of the elements can be selectively shaded, colored, designed, etc., in accordance with the particular aesthetic effect which is desired.

For example, in a preferred embodiment of the invention, as shown in FIG. 2, element 4 is arranged and constructed into a grid of nine columns, C–1 to C–9, and eleven rows, R–1 to R–11. The alternate rows, R–1, R–3, R–5, etc., in column C–1 are arranged so that that plastic material is opaque or black in color. The remaining areas of the grid, rows R–2, R–4, R–6, etc. in column C–1 are constructed of clear, transparent plastic. In column C–2, the odd numbered rows R–1, R–3, R–5, etc. are constructed of a clear plastic and the even numbered rows, R–2, R–4, R–6, etc., are constructed of the opaque material. All the odd numbered columns C–1, C–3, C–5, etc. and all the even numbered columns are constructed in an identical fashion so that the succeeding rows in any and every column alternate as to their light transmitting characteristics. In the preferred embodiment elements 3 and 4 are identical in construction and form an envelope or "storm window" effect. In other embodiments of the invention, wherein the "storm window" effect or envelope is not desired, one of the elements 3 or 4 can be dispensed with.

Element 8 is constructed in a like manner, excepting that the black or opaque portions of the grid are tinted to transmit light of desired wavelength, such as red or blue; that portion of the grid acting in effect as an optical filter.

In the preferred embodiment, element 9 is constructed in an identical manner as elements 3 and 4.

Referring now to FIG. 1, frame 2 is constructed so that the vertical edges 14, 15 and 16, as shown, are of a width equal to the width of a single column, C–1 to C–9, as shown in FIG. 2. This allows elements 8 and 9 to be selectively horizontally adjusted, by means of adjusting tabs 11 and 12, which protrude through opening 13. Element 8 is provided with an opening, not shown, similar to opening 13 of element 4 to allow for the adjustment of element 9.

By selectively adjusting elements 8 and 9 the light characteristic patterns can be varied as desired. For example, elements 3, 4, 8 and 9 are initially positioned so that the clear, transparent portions of the elements coincide, allowing sunlight, or the like, to be transmitted therethrough without variation. By selectively moving element 9 one column to the right or the left total darkness will be achieved inasmuch as the opaque portions of element 9 will coincide with the clear or transparent portions of elements 3, 4, and 8. Or, alternatively, by horizontally moving element 8 one column's width to the left or right, a tinted light will be projected as the tinted portion of element 9 is aligned with the clear sections of elements 3, 4 and 9.

It is readily observable that many and numerous variations of the preferred embodiment are possible and that diverse variation in hues, designs, and effects are obtainable with the disclosure of the apparatus of the preferred embodiment. The invention can be utilized not only as a window blind but also as a room divider, room enclosure, or the like, or in any application wherein it is desirable to obtain an aesthetic effect.

While the invention has been described with reference to the structural details disclosed, it is not confined to the exact apparatus shown herein and this application is intended to cover any modifications or adoptations of the invention coming within the purposes of the invention and the scope of the following claim.

I claim:
1. An apparatus for use as a window, including,
   (a) an enclosed envelope comprised of two parallel coplanar rectangular frames, each having a vertical dimension and a horizontal dimension;
   (b) two identical light transmitting elements, each respectively securely attached to one of said parallel coplanar rectangular frames, and each of said light transmitting elements being arranged into a symmetrical grid divided into a plurality of rows of rectangular areas in the vertical direction and into a definite number of columns of rectangular areas in the horizontal direction, wherein the successive areas in each row and column are alternately opaque and transparent; said areas of said first and second light transmitting elements being positioned so that the opaque and transparent areas of the first and second light transmitting elements are parallel and optically orthogonally coincident;
   (c) a third light transmitting element adjustably affixed within said envelope between said frames and said first and second light transmitting elements, said frames being at least one row or column wider than said third light transmitting element to permit movement of said third light transmitting element relative to first and second light transmitting elements; said third light transmitting element being arranged into a symmetrical grid similar to said grid of said first and second light transmitting elements and adjustably positioned so that said rows and columns of each are optically coincident; and
   (d) adjusting means attached to said third light transmitting element to permit movement of said third light transmitting element relative to said first and second light transmitting elements, whereby desired aesthetic effects can be obtained by selectively adjusting said third light transmitting elements relative to said first and second light transmitting elements.

References Cited

UNITED STATES PATENTS

| | | |
|---|---|---|
| 1,888,893 | 11/1932 | Tschorner. |
| 2,186,203 | 1/1940 | Centeno. |
| 2,246,001 | 6/1941 | Powers _____ 350—272 |
| 2,285,262 | 6/1942 | Fess et al. |
| 2,392,502 | 1/1946 | Potter. |
| 2,625,852 | 1/1953 | Van Orden. |
| 3,054,203 | 9/1962 | French. |

JULIA E. COINER, Primary Examiner

U. S. Cl. X. R..

350—272